United States Patent [19]

Ifrach

[11] 4,298,130
[45] Nov. 3, 1981

[54] ANTI-THEFT MOTOR FUEL TANK

[76] Inventor: Abraham Ifrach, 3220 Dalemead St., Torrance, Calif. 90505

[21] Appl. No.: 179,058

[22] Filed: Aug. 18, 1980

[51] Int. Cl.³ ...................... B65D 25/02; B65D 25/20
[52] U.S. Cl. ..................................... 220/20; 137/571; 137/576; 220/86 R; 220/86 AT; 280/5 A
[58] Field of Search ............... 220/86 R, 86 AT, 20; 137/571, 573, 575, 576, 264; 296/1 C; 280/5 A

[56] References Cited

U.S. PATENT DOCUMENTS

| | | | |
|---|---|---|---|
| 805,741 | 11/1905 | Lundy | 220/86 R |
| 1,939,423 | 12/1933 | Wahl | 220/86 AT |
| 2,043,223 | 6/1936 | Baumes | 220/86 R |
| 2,052,782 | 9/1936 | Mann | 220/86 AT |
| 3,863,690 | 2/1975 | Dean | 220/86 R X |

*Primary Examiner*—Allan N. Shoap
*Attorney, Agent, or Firm*—Harlan P. Huebner

[57] ABSTRACT

A vestibular tank is connected in series with a main fuel tank and provided with an inlet and a rimmed outlet so spaced as to inhibit passage of a siphon tube through the inlet and over the rim of the outlet. The outlet's rim also functions to retain a predetermined quantity of fuel in the vestibular tank which may be readily siphoned off and thus induce a belief that all the fuel remaining in the tanks has been removed.

9 Claims, 5 Drawing Figures

ANTI-THEFT MOTOR FUEL TANK

BACKGROUND OF THE INVENTION

1. Field of the Invention

The present invention relates to fluid handling systems and more particularly to a motor fuel tank system in which theft by siphoning is countered by a novel arrangement of paired tank compartments.

2. Description of the Prior Art

While a variety of devices for preventing the siphoning of fuel from the tanks of motor vehicles have been proposed, such as a conical wire spiral or the like insertable into the fuel inlet, a determined thief equipped with proper tools is able to remove or disable such devices.

The primary object of the present invention are to provide a motor fuel tank system which is resistant to such attack, and which will deceive one attempting siphoning into believing himself successful in emptying the entire tank.

SUMMARY OF THE INVENTION

These objects are achieved by providing a vestibular tank of much smaller volume than the main fuel tank of a motor vehicle, which either may be securely welded into position over the inlet opening of the main tank or built into the interior of the main tank in a position underlying the inlet opening of the main tank.

The vestibular tank is provided with a conventional inlet opening and with an outlet opening axially offset from the inlet opening. The outlet opening has an upstanding rim interiorly of the vestibular tank and communicates with the interior of the main tank, and both tanks are intended to be filled with motor fuel in ordinary usage.

This arrangement is such as to interdict access to the main tank by way of a flexible siphon tube introduced through the inlet opening of the vestibular tank. However, because of the upstanding rim interiorly of the vestibular tanks around its outlet opening, a small amount of fuel (depending upon the height of the rim) always will be held in the vestibular tank and easily can be siphoned off. This will tend to cause the fuel thief to believe that he has inserted his siphon tube into a nearly empty tank.

Of course, if the main tank is full and the vestibular tank contains fuel above the level of the above mentioned rim, more fuel can be siphoned off, enhancing the impression given the thief that he has obtained all that was in the main tank.

DESCRIPTION OF THE PREFERRED EMBODIMENTS

The present invention may be embodied in any of a plurality of modifications depending upon, for example, where it is to be applied to an existing vehicle tank or built into a tank for a vehicle either as original equipment or as a tank replacement.

Figure 1:
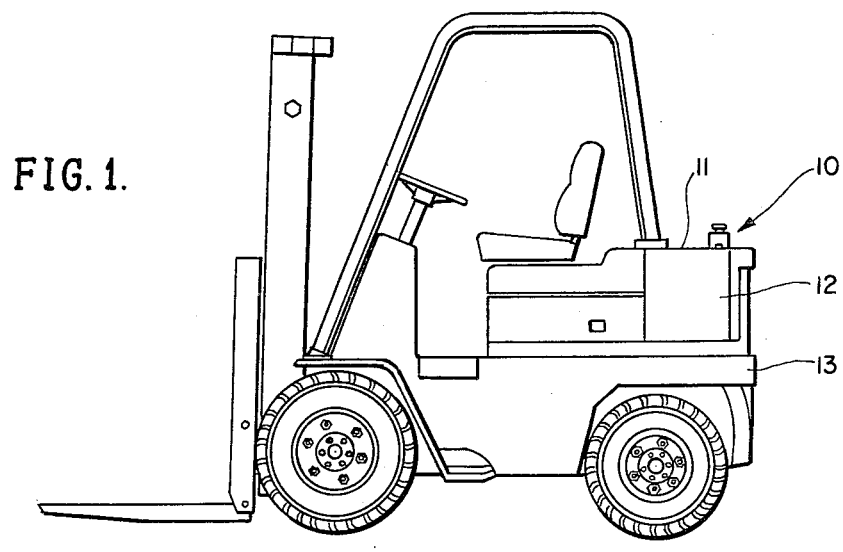
FIG. 1 is a view in side elevation of a lift truck showing the positioning of the tank of the present invention on the vehicle.
Figure 2:
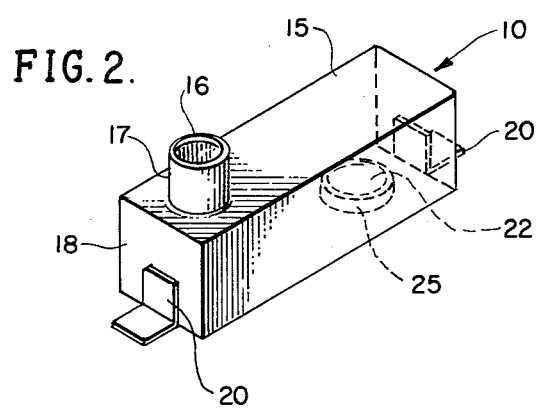
FIG. 2 is a perspective view of one form of the vestibular tank of the present invention.
Figure 3:
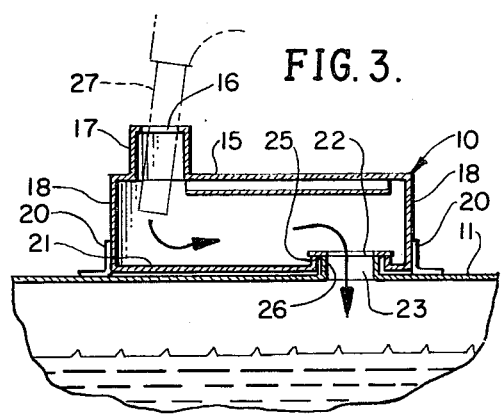
FIG. 3 is a sectional view in side elevation of the vestibular tank of FIG. 2 secured in functional relationship to a main fuel tank.

In the embodiment shown in FIGS. 1, 2 and 3, a vestibular tank 10 is mounted on the top 11 of the main fuel tank 12 of a vehicle 13 illustrated as a standard type of lift truck. The vestibular tank 10 is a metal tank having a top 15 provided with an inlet opening 16 surrounded by a neck 17 and ends 18 to each of which is secured, as by welding, a bracket 20 which also is welded to the top 11 of the main tank 10.

A bottom 21 of the vestibular tank 10 is provided with an outlet opening 22 positioned over an inlet opening 23 of the main tank 12. A rim 25 extends around the outlet opening 22 and upwardly interiorly of the vestibular tank for the dual purpose of retaining in that tank a predetermined amount of fuel (depending upon the rim's height), and preventing passage of a siphon tube from the inlet opening 16 through the outlet opening 22. For these purposes the vestibular tank 10 is dimensioned and its inlet and outlet openings are dimensioned and positioned so that the outlet opening 22 is laterally offset from the inlet opening 16 a distance at least as great as twice the diameter of the inlet opening 16. A rim 26 extending around the inlet opening 23 of the main tank 12 and upwardly into the interior of the vestibular tank 10 may substitute for the rim 25 if desired.

In use, the vestibular tank 10 is positioned on the top 11 of the main tank 12 with its outlet opening 22 overlying the inlet opening 23 of the main tank 12 and sealant material (not shown) applied around the rim 26 to prevent leakage. The brackets 20 are then welded to the top 11 of the main tank to retain the vestibular tank 10 securely in position.

The main tank 12 and, if desired, the vestibular tank 10 also, may then be filled with fuel from a hose nozzle 27 or the like; the introduced fuel flowing along the path indicated by the arrows in FIG. 3. Under these circumstances a quantity of fuel, depending upon the height of rim 25, will be retained in the vestibular tank 10 whether or not that tank is filled.

Figure 4:
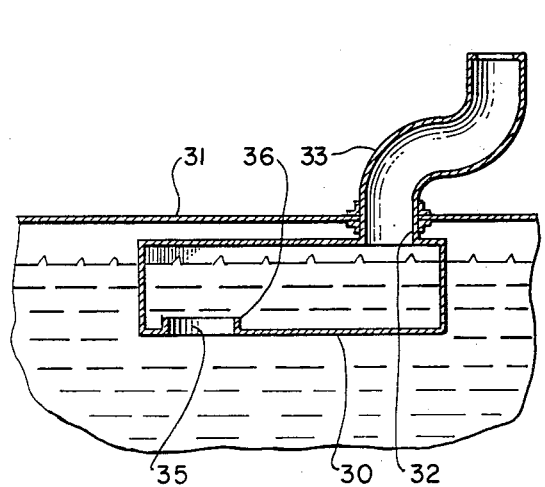
FIG. 4 is a sectional view in side elevation of a modified embodiment of the invention in which the vestibular tank of FIG. 2 is secured within a main fuel tank.

In the embodiment shown in FIG. 4, there is provided a vestibular tank 30 of substantially the same construction as the vestibular tank 10, but lacking the brackets 20 of the latter. In this embodiment the vestibular tank 10 is enclosed within the metal main tank 31 and maintained in the position shown by securing its inlet neck 32 to the inlet pipe 33 of the main tank 31. An outlet opening 35 is provided with a rim 36. The opening 35, like opening 22, is in direct communication with the interior of the main tank 31.

Figure 5:
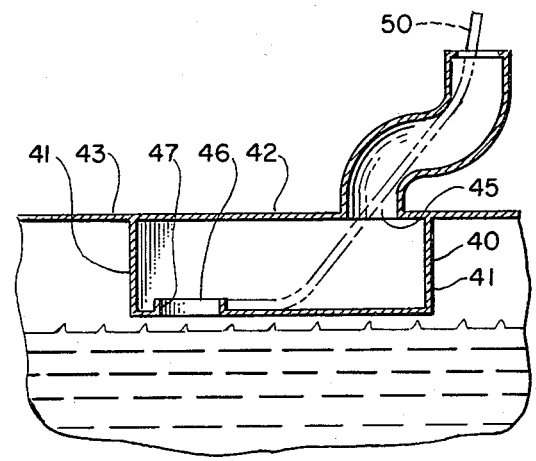
FIG. 5 is a sectional view in side elevation of a second modified embodiment of the invention in which a vestibular tank is formed as an integral division of a main fuel tank.

In the embodiment shown in FIG. 5, a vestibular tank 40 has sides 41 secured, as by welding, to the inside of the upper wall 42 of the main tank 43 and is positioned within the main tank so that a common opening 45 constitutes the inlet of both the main and vestibular tanks. As in the modification shown in FIG. 4, that shown in FIG. 5 has an outlet opening 46 provided with a rim 47 which opening, like openings 22 and 35, is in direct communication with the interior of the main tank 43.

As shown in FIG. 5, any attempt to remove fuel from the systems, as by introducing a siphon tube 50 through opening 45 will be arrested by contact of the tube's end with rim 47. Nevertheless, fuel contained in the vestibular tank 40 below the level of rim 47 may be withdrawn through such a tube and the success of a thief in obtaining some fuel by such means will tend to cause him to believe that he has encountered a tank with only a small amount of fuel left in it and that he has emptied it. All of the modifications shown and described function in this manner.

I claim:

1. An anti-theft motor fuel tank system comprising a main fuel tank having an inlet opening in its upper portion, a vestibular tank having an inlet opening in its upper portion and an outlet opening in its lower portion laterally offset from the inlet opening of said vestibular tank; said vestibular tank being secured to said main tank with its outlet opening in communication with the interior of said main tank, and a rim extending around the outlet opening of said vestibular tank and upwardly interiorly thereof whereby a predetermined amount of fuel may be retained in said vestibular tank and passage of a siphon tube from the inlet opening through the outlet opening of said vestibular tank is prevented while permitting siphoning thereby of such retained fuel.

2. An anti-theft motor fuel tank system according to claim 1 in which the outlet opening of the vestibular tank is offset from the inlet opening of that tank a distance at least as great as twice the diameter of said inlet opening.

3. An anti-theft motor fuel tank system according to claim 2 in which the vestibular tank is fixedly secured to the exterior of the main tank with its outlet opening overlying the inlet opening of the main tank.

4. An anti-theft motor fuel tank system according to claim 2 in which the vestibular tank is mounted within the main tank with its inlet opening connected to the inlet opening of the main tank and its outlet opening opening into the interior of the main tank.

5. An anti-theft motor fuel tank system according to claim 4 in which the interior of the top wall of the main tank forms the top wall of the vestibular tank.

6. An anti-theft motor fuel tank system according to claim 1 in which the vestibular tank is fixedly secured to the exterior of the main tank with its outlet opening overlying the inlet opening of the main tank.

7. An anti-theft motor fuel tank system according to claim 1 in which the vestibular tank is mounted within the main tank with its inlet opening connected to the inlet opening of the main tank and its outlet opening opening into the interior of the main tank.

8. An anti-theft motor fuel tank system according to claim 7 in which the interior of the top wall of the main tank forms the top wall of the vestibular tank.

9. An anti-theft attachment for the inlet opening of a vehicle motor fuel tank comprising a vestibular tank having an outlet opening in its lower portion of substantially the same diameter as the inlet opening of the vehicle fuel tank and an inlet opening of substantially the same diameter in its upper portion; the inlet and outlet openings of said vestibular tank being horizontally offset with respect to each other a distance at least as great as twice the diameter of said inlet opening, a rim extending around the outlet opening of said vestibular tank and upwardly interiorly thereof whereby a predetermined amount of fuel may be retained in said vestibular tank and passage of a siphon tube from the inlet opening through the outlet opening of said vestibular tank is prevented while permitting siphoning thereby of such retained fuel, and means for attaching said vestibular tank to a vehicle motor fuel tank with the outlet opening of the vestibular tank connected to the inlet opening of said vehicle tank.

* * * * *